United States Patent
Uemura et al.

(10) Patent No.: US 12,092,895 B2
(45) Date of Patent: Sep. 17, 2024

(54) LENS BARREL WITH DECELERATION MECHANISM AND IMAGE PICKUP APPARATUS

(71) Applicant: CANON KABUSHIKI KAISHA, Tokyo (JP)

(72) Inventors: Kohei Uemura, Kanagawa (JP); Mitsuhiro Izumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 410 days.

(21) Appl. No.: 17/316,145

(22) Filed: May 10, 2021

(65) Prior Publication Data
US 2021/0356846 A1    Nov. 18, 2021

(30) Foreign Application Priority Data
May 12, 2020   (JP) .................. 2020-084026

(51) Int. Cl.
*G02B 7/02*   (2021.01)
*G02B 7/04*   (2021.01)
(Continued)

(52) U.S. Cl.
CPC .............. *G02B 7/04* (2013.01); *G02B 7/021* (2013.01); *G02B 7/023* (2013.01); *G02B 7/08* (2013.01);
(Continued)

(58) Field of Classification Search
CPC .......... G02B 7/04; G02B 7/021; G02B 7/023; G02B 7/08; G02B 7/14; G02B 27/646;
(Continued)

(56) References Cited

U.S. PATENT DOCUMENTS

| 7,162,152 B2 * | 1/2007 | Akabane ................. G01D 5/145 324/207.11 |
| 2011/0134549 A1 * | 6/2011 | Hase ........................ G02B 7/04 359/824 |

(Continued)

FOREIGN PATENT DOCUMENTS

| JP | 2000047089 A | 2/2000 |
| JP | 2006047665 A | 2/2006 |

(Continued)

OTHER PUBLICATIONS

The above foreign patent documents were cited in the Feb. 6, 2024 Japanese Office Action, of which is enclosed without an English Translation, that issued in Japanese Patent Application No. 2020-084026.

*Primary Examiner* — Mahidere S Sahle
(74) *Attorney, Agent, or Firm* — Cowan, Liebowitz & Latman, P.C.

(57) ABSTRACT

A lens barrel and an image pickup apparatus that can be downsized and have a high degree of freedom in design is provided. The lens barrel includes a fixed barrel, a guide barrel fixed to the fixed barrel, a cam barrel rotatably supported by the guide barrel, a driver that is supported by the fixed barrel and drives the cam barrel, and a deceleration mechanism that is disposed so as to connect the driver and the cam barrel and decelerates rotation from the driver to transmit the rotation to the cam barrel. The driver is disposed inside the cam barrel. At least part of the deceleration mechanism is disposed so as to overlap the cam barrel when viewed from a direction of an optical axis of an image pickup optical system.

12 Claims, 12 Drawing Sheets

(51) Int. Cl.
*G02B 7/08* (2021.01)
*G02B 27/64* (2006.01)
*G03B 3/10* (2021.01)
*G03B 5/00* (2021.01)
*G03B 17/14* (2021.01)
*G02B 7/14* (2021.01)

(52) U.S. Cl.
CPC ............. *G02B 27/646* (2013.01); *G03B 3/10* (2013.01); *G03B 5/00* (2013.01); *G03B 17/14* (2013.01); *G02B 7/14* (2013.01); *G03B 2205/0007* (2013.01); *G03B 2205/0053* (2013.01)

(58) Field of Classification Search
CPC . G03B 3/10; G03B 5/00; G03B 17/14; G03B 2205/0007; G03B 2205/0053
USPC .................................. 359/694–706, 822–827
See application file for complete search history.

(56) References Cited

U.S. PATENT DOCUMENTS

| | | | |
|---|---|---|---|
| 2012/0154614 A1* | 6/2012 | Moriya | H04N 23/54 348/208.5 |
| 2013/0033770 A1* | 2/2013 | Koga | G02B 7/08 359/822 |
| 2013/0148954 A1* | 6/2013 | Uehara | G03B 17/14 396/532 |
| 2014/0176037 A1* | 6/2014 | Yoshimuta | G05B 1/03 318/632 |
| 2021/0096320 A1* | 4/2021 | Otsuka | H04N 23/55 |

FOREIGN PATENT DOCUMENTS

| | | |
|---|---|---|
| JP | 2006330255 A | 12/2006 |
| JP | 2013-050702 A | 3/2013 |
| JP | 2020038274 A | 3/2020 |
| WO | 2012107965 A | 8/2012 |

\* cited by examiner

LENS BARREL WITH DECELERATION MECHANISM AND IMAGE PICKUP APPARATUS

BACKGROUND OF THE INVENTION

Field of the Invention

The present invention relates to a lens barrel having a deceleration mechanism that transmits rotation to a cam barrel and an image pickup apparatus.

Description of the Related Art

Some lens barrels of digital cameras, video cameras, interchangeable lenses, and the like are equipped with a focus drive mechanism including a reduction gear and an actuator. This lens barrel transmits a driving force of the actuator to a cam barrel by an action of the reduction gear to move a focus group forward and rearward by guiding a movement roller fitted with a cam groove in an optical axis direction. There is also a lens barrel having a camera shake correction mechanism that reduces camera shake of a photographer by driving a lens group in a direction orthogonal to the optical axis direction.

In the focus drive mechanism, it is generally necessary to arrange a motor and a plurality of gears in the vicinity of the cam barrel. However, in a case of an optical system in which the camera shake correction mechanism is disposed near the earn barrel, when the focus drive mechanism is disposed on an outer diameter side of the camera shake correction mechanism in order to avoid the camera shake correction mechanism, an entire lens barrel is large. Japanese Laid-Open Patent Publication (kokai) No. 2013-50702 discloses a configuration in which an overall length of the lens barrel can be shortened by disposing the focus drive mechanism including the motor and gear inside the cam barrel.

However, in the configuration of Japanese Laid-Open Patent Publication (kokai) No. 2013-50702, it is possible to arrange only gears that can be accommodated within an inner and outer diameter difference between the cam barrel and an inner lens, and a degree of freedom in design is low. Therefore, the number of parts may increase depending on a gear ratio to be set. Therefore, there is room for improvement from the viewpoint of increasing the degree of freedom in design while downsizing the product as a whole.

SUMMARY OF THE INVENTION

The present invention provides a lens barrel and an image pickup apparatus that can be downsized and have a high degree of freedom in design.

Accordingly, the present invention provides a lens barrel comprising a fixed barrel, a guide barrel fixed to the fixed barrel, a cam barrel rotatably supported by the guide barrel, a driver that is supported by the fixed barrel and drives the cam barrel, and a deceleration mechanism that is disposed so as to connect the driver and the cam barrel and decelerates rotation from the driver to transmit the rotation to the cam barrel, wherein the driver is disposed inside the cam barrel, and at least part of the deceleration mechanism is disposed so as to overlap the cam barrel when viewed from a direction of an optical axis of an image pickup optical system.

According to the present invention, it is possible to realize downsizing and increase the degree of freedom in design.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
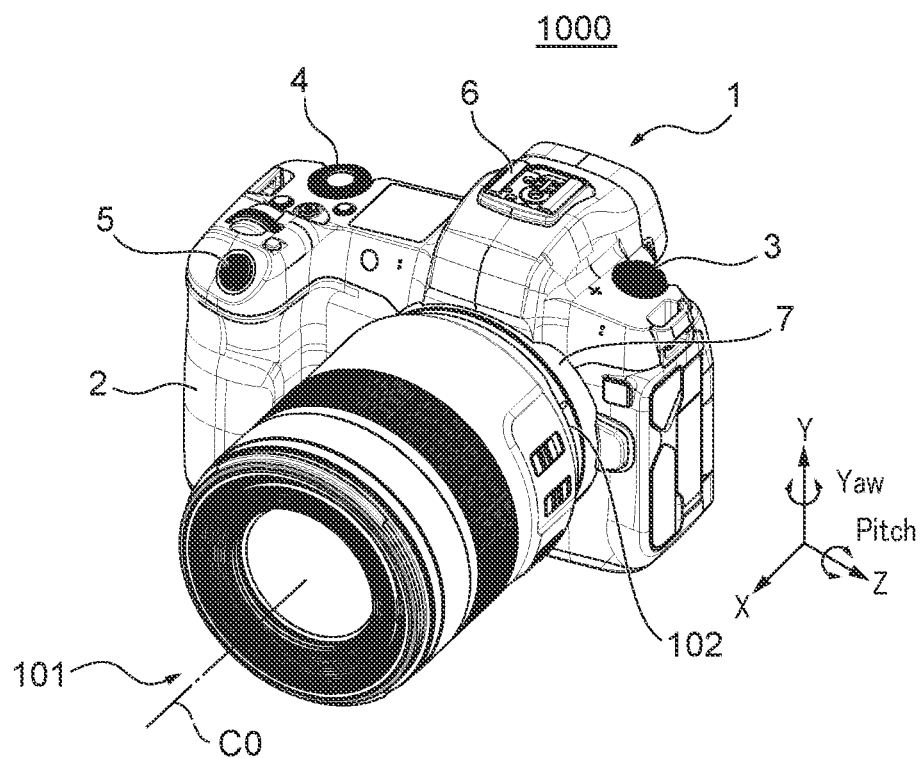
FIGS. 1A and 1B are perspective views of a camera system.
Figure 1B:
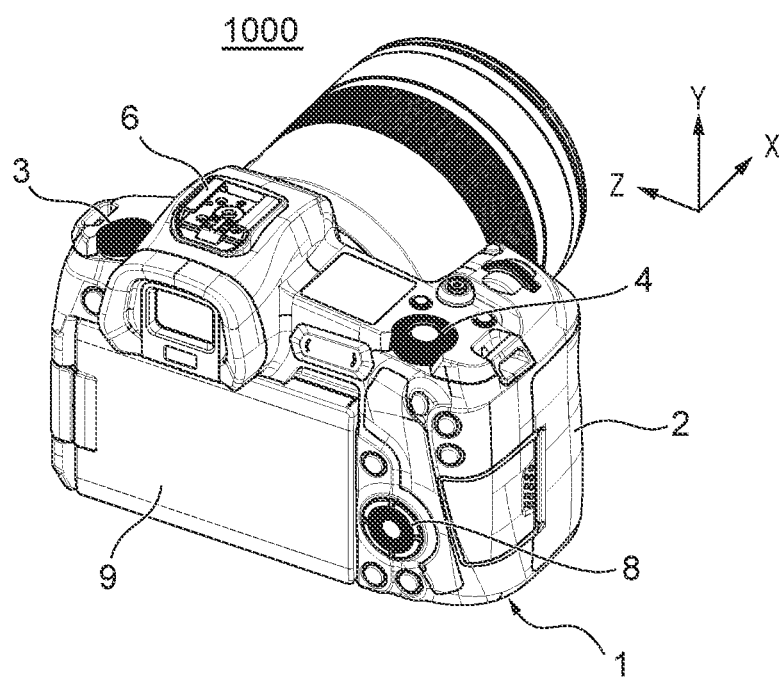

FIGS. 1A and 1B are perspective views of a camera system 1000 to which a lens barrel 101 according to the embodiment of the present invention is applied. The camera system 1000 as an image pickup apparatus includes the lens barrel 101 and a camera body 1. An interchangeable lens can be attached to and detached from the camera body 1, and the lens barrel 101, which is an interchangeable lens, is attached to the camera body 1 shown in FIGS. 1A and 1B.

Hereinafter, a direction of each part will be referred to with reference to X, Y, and Z coordinate axes shown in FIGS. 1A and 1B. Here, for convenience, a subject side is referred to as a front in a direction parallel to that of an optical axis C0 of an image pickup optical system accommodated in the lens barrel 101. Therefore, an optical axis direction is an X-axis direction. For example, in FIGS. 1A and 1B, a +Y direction is upward and a −X direction is rearward. A +Z direction is to a right direction when viewed from a subject. Therefore, FIGS. 1A and 1B are front side and rear side perspective views of the camera system 1000, respectively. A direction of rotation around the Z axis is a pitch direction, and a direction of rotation around the Y axis is a yaw direction.

A grip portion 2 for a user to grip the camera body 1 by hand is provided on a left side portion (−Z side portion) of the camera body 1. Further, a power supply operation unit 3 is disposed on an upper part of the camera body 1. When the user turns on the power supply operation unit 3 while the camera body 1 is in a power-off state, the camera body 1 is in a power-on state and it is possible to pick up an image. When the user turns off the power supply operation unit 3 while the camera body 1 is in the power-on state, the camera body 1 is turned off.

A mode dial 4, a release button 5, and an accessory shoe 6 are provided on the upper part of the camera body 1. An image pickup mode can be switched by the user rotating the mode dial 4. The image pickup mode includes a manual still image pickup mode in which the user can arbitrarily set image pickup conditions such as a shutter speed and an aperture value, an automatic still image pickup mode in which an appropriate exposure amount is automatically obtained, a moving image pickup mode for picking up a moving image, and the like. The user can give an instruction to perform image pickup preparation operations such as autofocus and automatic exposure control by pressing the release button 5 halfway, and can give an instruction to pick up an image by fully pressing the release button 5. An accessory such as an external flash is detachably attached to the accessory shoe 6.

An image pickup optical system that forms a subject image by forming an image of light from the subject is accommodated in the lens barrel 101. An image pickup device 16 (FIG. 3) that photoelectrically converts (picks up) the subject image formed by the image pickup optical system in the lens barrel 101 is provided in the camera body 1. The lens barrel 101 is mechanically and electrically connected to a camera mount 7 provided on the camera body 1 via a lens mount 102.

As shown in FIG. 1B, a rear operation unit 8 and a display unit 9 are provided on a rear face of the camera body 1. The rear operation unit 8 includes a plurality of buttons and dials to which various functions are assigned. When the power of camera body 1 is turned on, and the still image pickup mode or the moving image pickup mode is set, a through image of the subject image picked up by the image pickup device 16 is displayed on the display unit 9. In addition, image pickup parameters that indicate image pickup conditions such as the shutter speed and the aperture value are displayed on the display unit 9, and it is possible to change a set value of the image pickup parameters by the user operating the rear operation unit 8 while looking at the display. The rear operation unit 8 includes a play button for giving an instruction to replay a recorded pickup image, and when the user operates the play button, the pickup image is replayed and displayed on the display unit 9.

Figure 2:
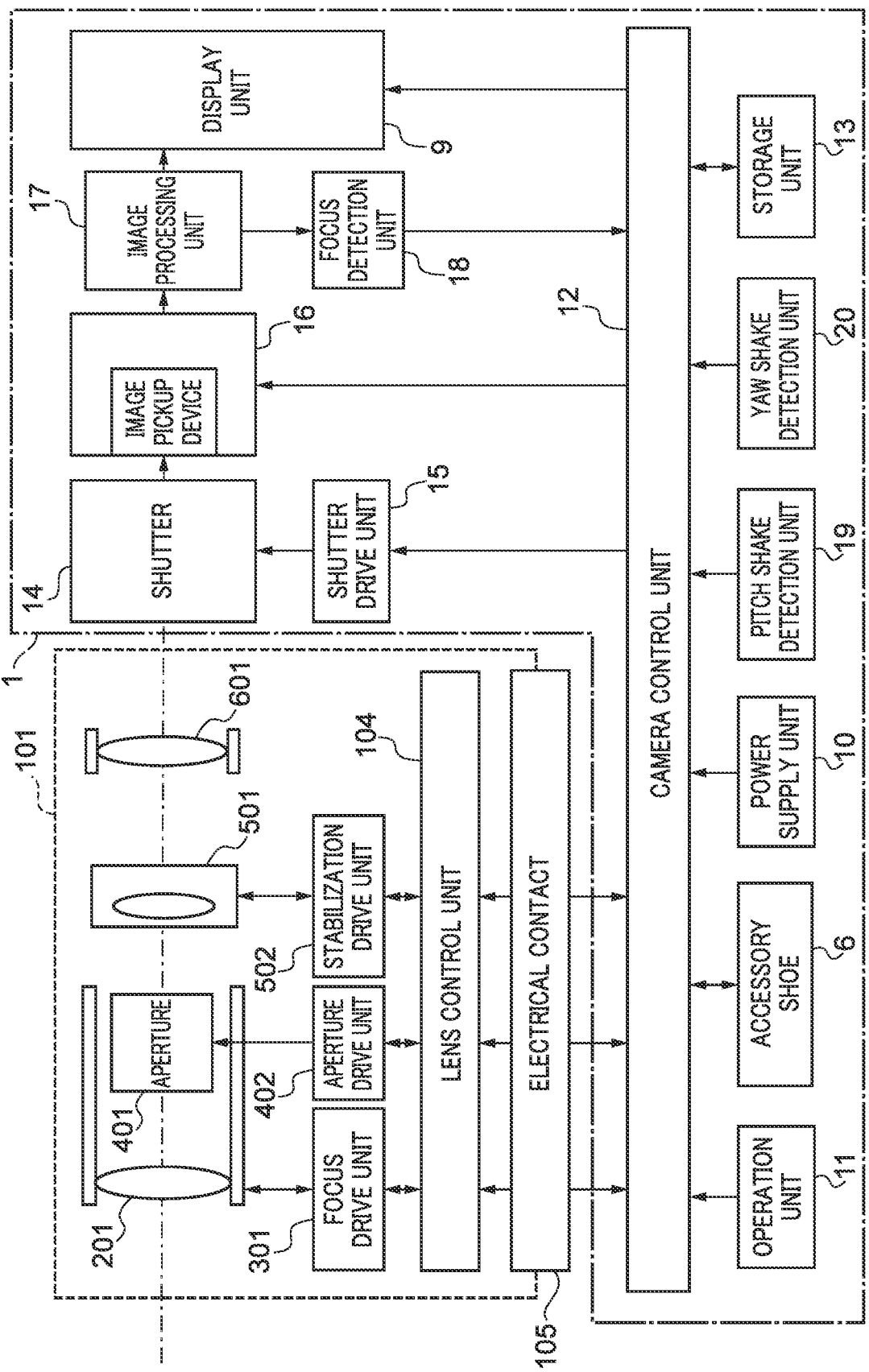
FIG. 2 is a block diagram of a lens barrel and a camera body.

FIG. 2 is a block diagram showing electrical and optical configurations of the lens barrel 101 and the camera body 1. The camera body 1 includes a power supply unit 10 that supplies electric power to the camera body 1 and the lens barrel 101, and an operation unit 11. The operation unit 11 includes the power supply operation unit 3, the mode dial 4, the release button 5, the rear operation unit 8, and a touch panel function of the display unit 9 described above.

A control of the entire camera system 1000 including the camera body 1 and the lens barrel 101 is performed by a camera control unit 12 provided in the camera body 1 and a lens control unit 104 provided in the lens barrel 101 cooperating to each other. The camera control unit 12 reads and executes a computer program stored in a storage unit 13. At this time, the camera control unit 12 communicates with the lens control unit 104 of various control signals, data, and the like via a communication terminal of an electrical contact 105 provided on the lens mount 102. The electrical contact 105 includes a power supply terminal that supplies power from the power supply unit 10 to the lens barrel 101.

The image pickup optical system of the lens barrel 101 includes a focus group 201 including a focus lens that moves in the optical axis direction to adjust a focus, an aperture group 401 that adjusts an amount of light, and a stabilizing group 501 including a shift lens that reduces image shake.

Further, the image pickup optical system includes a fixed group 601. The stabilizing group 501 moves (shifts) the shift lens in the Z-axis direction and the Y-axis direction orthogonal to the optical axis C0 to perform a stabilizing operation for suppressing image shake. Further, the lens barrel 101 includes a focus drive unit 301 that drives the focus group 201, an aperture drive unit 402 that drives the aperture group 401, and a stabilization drive unit 502 that drives the stabilizing group 501.

In addition to the display unit 9, the camera body 1 includes a shutter unit 14, a shutter drive unit 15, the image pickup device 16, an image processing unit 17, a focus detection unit 18, and the camera control unit 12. The shutter unit 14 controls an amount of light collected by the image pickup optical system and exposed by the image pickup device 16 in the lens barrel 101. The image pickup device 16 photoelectrically converts the subject image formed by the image pickup optical system to output an image pickup signal. The image processing unit 17 generates an image signal after performing various image processing on the image pickup signal. The display unit 9 displays an image signal (through image) output from the image processing unit 17, displays an image pickup parameter as described above, and replays and displays a pickup image recorded in the storage unit 13 or a recording medium (not shown).

The camera control unit 12 controls the drive of the focus group 201 in response to the image pickup preparation operation (a half-press operation of the release button 5) in the operation unit 11. For example, when the autofocus operation is instructed, the focus detection unit 18 determines a focus state of the subject image imaged by the image pickup device 16 based on the image signal generated by the image processing unit 17 to generate a focus signal to transmit it to the camera control unit 12. At the same time, the focus drive unit 301 detects a current position of the focus group 201 to transmit the detection signal to the camera control unit 12 via the lens control unit 104. The camera control unit 12 compares the focus state of the subject image with the current position of the focus group 201 to calculate a focus drive amount from a deviation amount to transmit it to the lens control unit 104. Then, the lens control unit 104 drive controls the focus group 201 to a target position via the focus drive unit 301 to correct a defocus of the subject image.

Figure 5A:
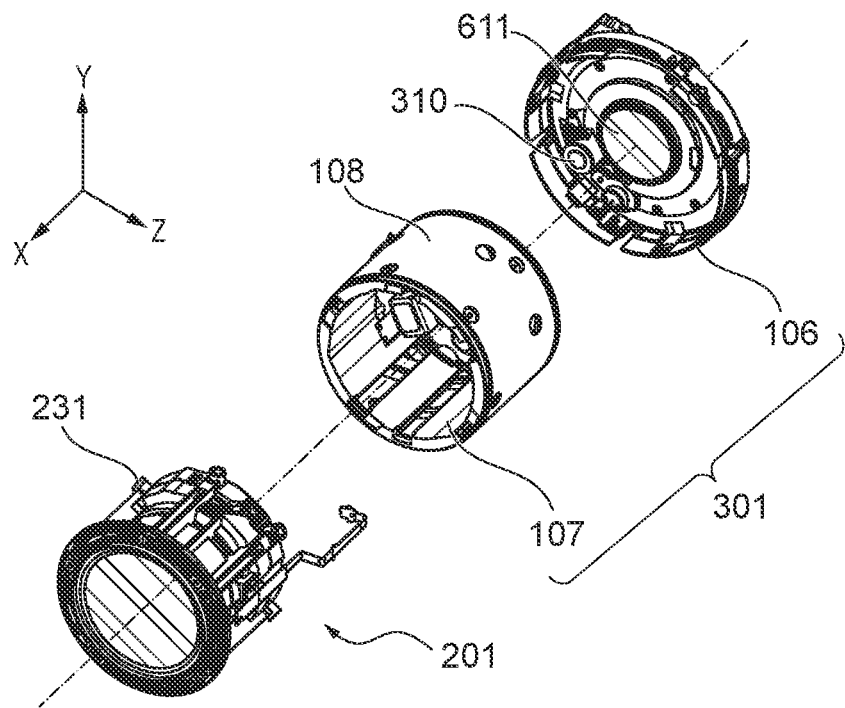
FIGS. 5A and 5B are front side and rear side exploded perspective views of a focus group and a focus drive unit.

Although details will be described below in FIG. 5A, FIG. 7, etc., the focus drive unit 301 includes a cam barrel 108, a drive motor 310, a reduction gear (described later with reference to FIGS. 6 to 8) that connects the cam barrel 108 and the drive motor 310, and a photo interrupter that detects an origin position of the focus group 201. In general, a stepping motor, which is a type of actuator, is often adopted as the drive motor 310, which is a driver. However, since the stepping motor can control only a relative drive amount, the current position of the focus group 201 is indefinite in the power-off state. Therefore, when the user turns on the power supply operation unit 3, it is necessary to control the focus group 201 to move to the origin position and execute an origin position detection process. Since the control of the origin position detection process is a known technique that has been adopted in many optical instruments, the description thereof is omitted here. As the actuator applied to the focus drive unit 301, a DC motor or an ultrasonic motor provided with an encoder may be adopted. Further, the photo interrupter directly receives light emitted from a light emitting unit at a light receiving unit, but instead of this, a photo reflector that receives a reflected light from a reflecting surface, or a brush that comes into contact with a conductive pattern may be used.

The camera control unit 12 controls the drive of the aperture group 401 and the shutter unit 14 through the aperture drive unit 402 and the shutter drive unit 15 according to set values of the aperture value and the shutter speed received from the operation unit 11. For example, when the operation of automatic exposure control is instructed, the camera control unit 12 receives a luminance signal generated by the image processing unit 17 and performs photometric calculation. Based on this photometric calculation result, the camera control unit 12 controls the drive of the aperture group 401 in response to an image pickup instruction operation (a full press operation of the release button 5) in the operation unit 11. At the same time, the camera control unit 12 controls the drive of the shutter unit 14 via the shutter drive unit 15 and performs an exposure process by the image pickup device 16.

The camera body 1 includes a pitch shake detection unit 19 and a yaw shake detection unit 20 in order to detect image shake such as camera shake by the user. The pitch shake detection unit 19 and the yaw shake detection unit 20 use an angular velocity sensor (vibrating gyro) and an angular acceleration sensor to detect image shake in the pitch direction (the rotation direction around the Z axis) and the yaw direction (the rotation direction around the Y axis) to output a shake signal, respectively. The camera control unit 12 calculates a shift position of the stabilizing group 501 in the Y-axis direction using the shake signal from the pitch shake detection unit 19. Similarly, the camera control unit 12 calculates a shift position of the stabilizing group 501 in the Z-axis direction using the shake signal from the yaw shake detection unit 20. The camera control unit 12 drive controls the stabilizing group 501 to the target position according to the calculated shift positions in the pitch/yaw directions to perform a stabilizing operation to reduce image shake during exposure and through image display.

Figure 3:
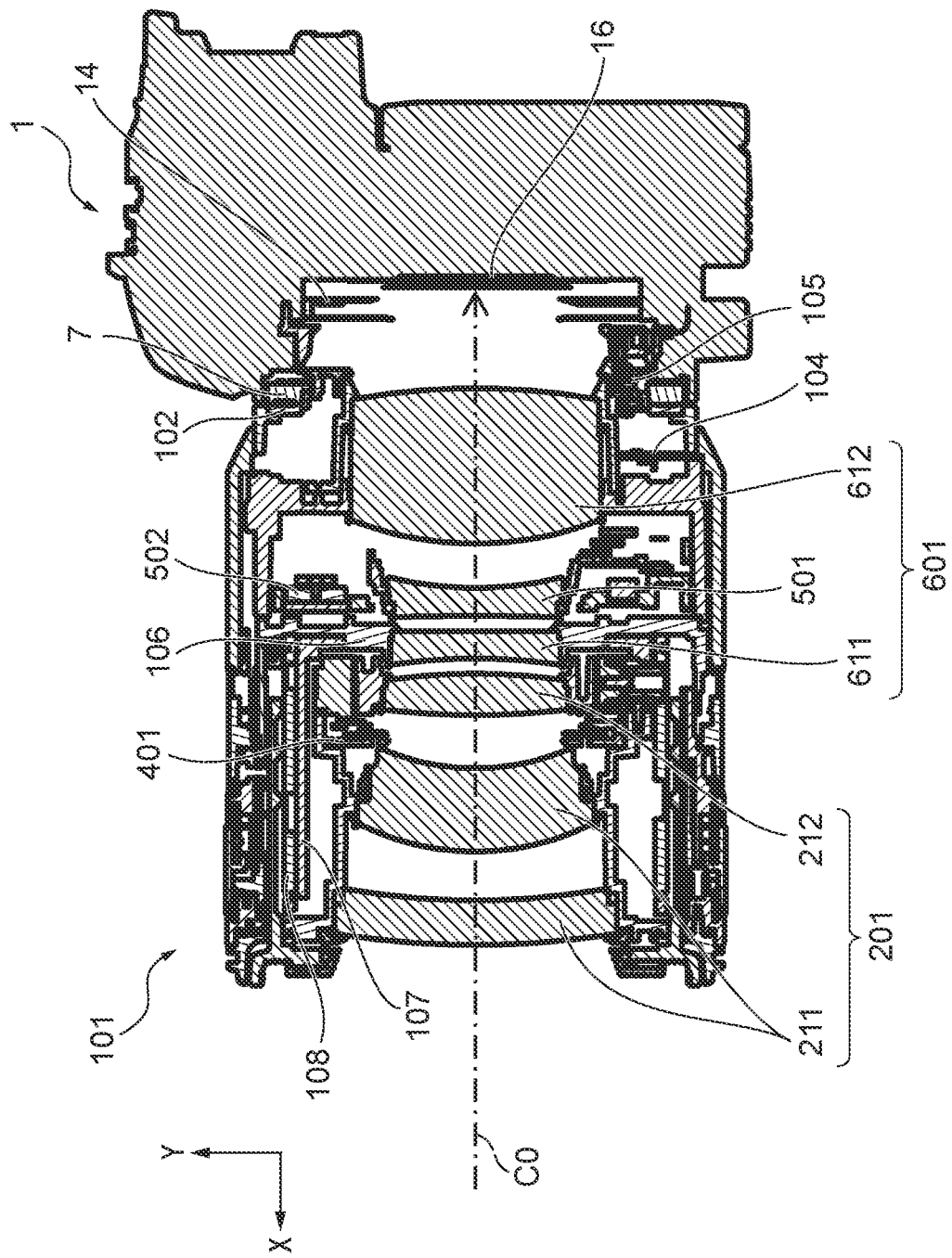
FIG. 3 is a cross-sectional view of the camera system.
Figure 4:
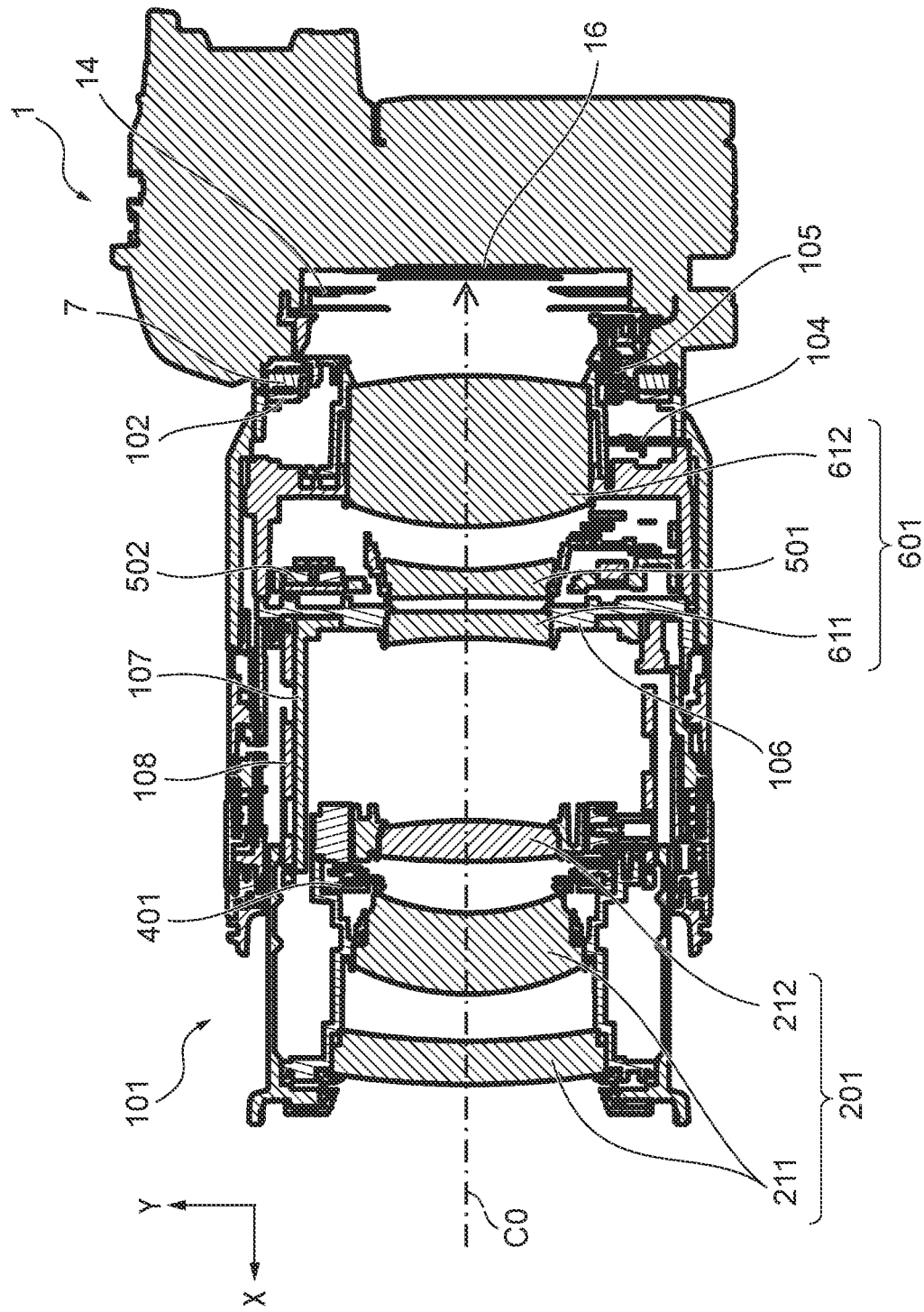
FIG. 4 is a cross-sectional view of the camera system.

A positional relationship of the components in the lens barrel 101 and the camera body 1 will be described with reference to FIGS. 3 and 4. FIGS. 3 and 4 are cross-sectional views of the camera system 1000 on an XY plane including the optical axis. Specifically, FIGS. 3 and 4 show a retraction state and an extension state of the focus group 201, respectively. Since a center line of the camera system 1000 shown in FIGS. 3 and 4 substantially coincides with the optical axis C0 determined by the image pickup optical system, it is hereinafter synonymous with the optical axis C0.

The lens barrel 101 has, as an example of an image pickup optical system, a two-group configuration consisting of the focus group 201 including a first focus lens 211 and a second focus lens 212, and the fixed group 601 including a first fixed lens 611 and a second fixed lens 612. The focus group 201, which has moved to a predetermined optical position according to the defocus of the subject image, forms an image of light from the subject on an image pickup plane of the image pickup device 16 via the fixed group 601. The aperture group 401 together with the first focus lens 211 and the second focus lens 212 is accommodated in the focus group 201, and moves integrally with the focus group 201. On the other hand, the stabilizing group 501 is disposed between the first fixed lens 611 and the second fixed lens 612, and functions as part of the fixed group 601.

Further, the lens barrel 101 is intended to maintain an optical performance of the entire image pickup optical system, and has an adjustment mechanism that intentionally shifts a position of the second focus lens 212. As a result, an operator can cancel the effects of manufacturing errors and assembly variations that occur in each component while checking an overall optical performance status in an assembly process of the lens barrel 101.

Figure 5B:
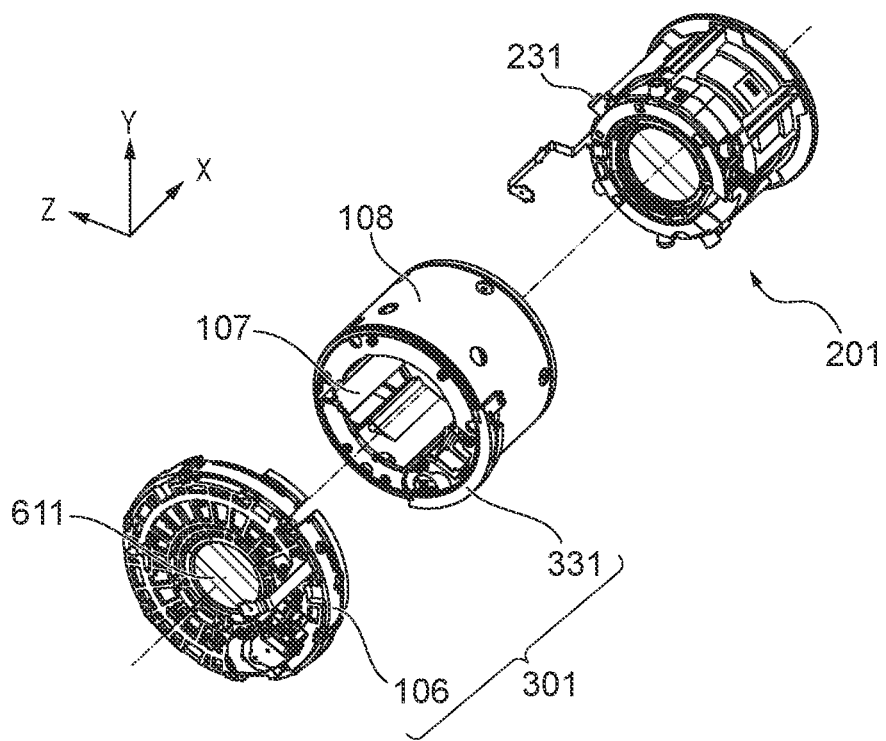
Figure 6:
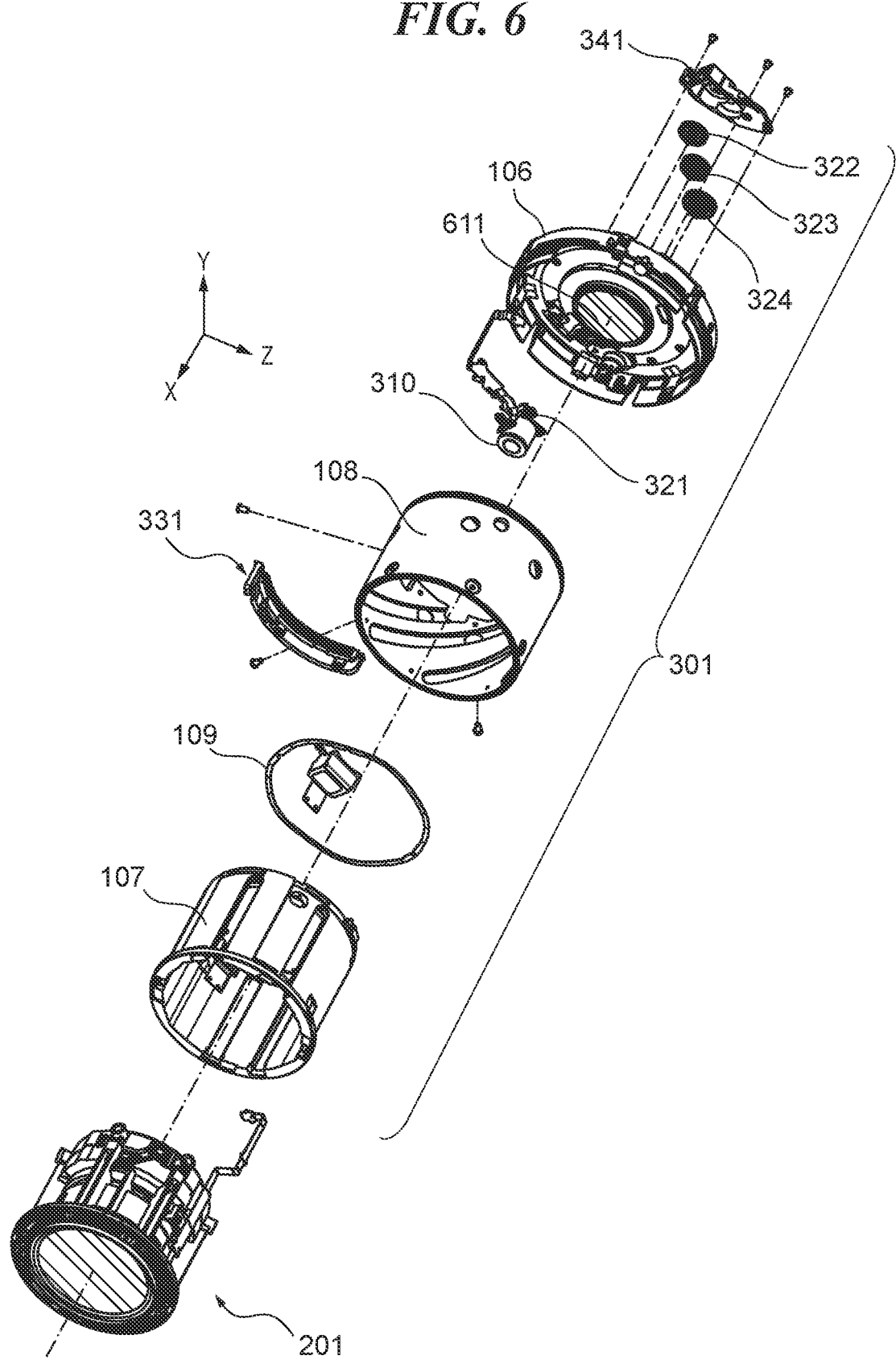
FIG. 6 is a perspective view of part of the focus drive unit disassembled in detail.

Next, the focus drive mechanism will be described in detail with reference to FIGS. 5A, 5B, and 6. FIGS. 5A and 5B are front side and rear side exploded perspective views of the focus group 201 and the focus drive unit 301, respectively. FIG. 6 is a perspective view in Which part of the focus drive unit 301 shown in FIG. 5A is further disassembled.

A fixed barrel 106 is a fixed member that holds the first fixed lens 611 at an inner periphery and holds a straight guide barrel (guide barrel) 107 at a frontside face. The straight guide barrel 107 is a fixing member that accommodates the focus group 201 in an inner periphery and rotatably holds the cam barrel 108 at an outer periphery. The cam barrel 108 is urged in the optical axis direction by an elastic member 109, and a rear side (−X side) face of the cam barrel 108 is slidably adhered to the fixed barrel 106.

The drive motor 310 is fixed to the front side (+X side) face of the fixed barrel 106 so that its rotation shaft 312 (FIGS. 7 and 8) is substantially parallel to the optical axis direction. A deceleration mechanism that decelerates the rotation from the drive motor 310 to transmit it to the cam barrel 108 is disposed so as to connect the drive motor 310 and the cam barrel 108. The deceleration mechanism includes a first reduction gear 321, a second reduction gear 322, a third reduction gear 323, a fourth reduction gear 324, and a cam barrel gear 331 (see FIG. 7).

Figure 7:
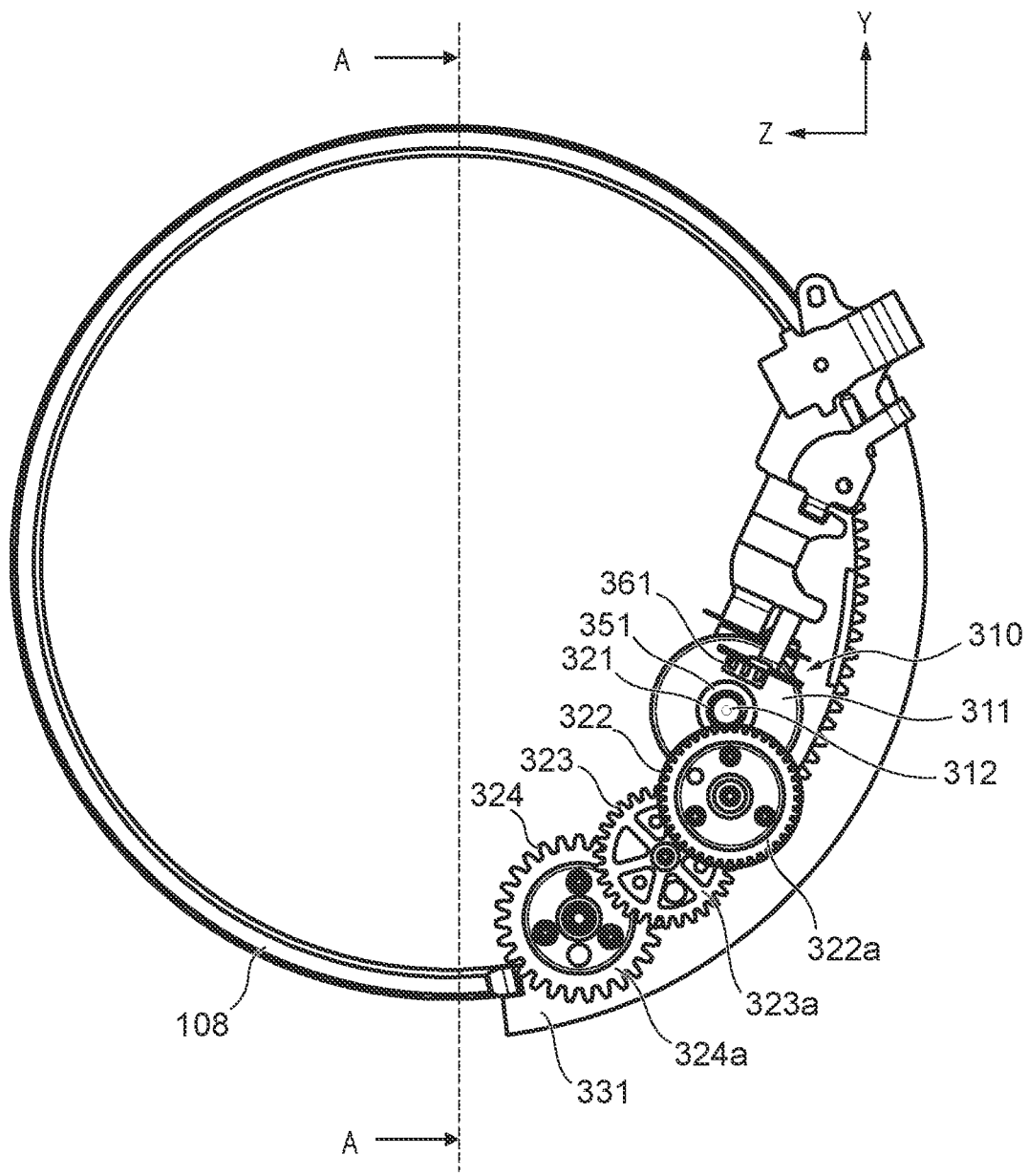
FIG. 7 is a rear view of a cam barrel, a drive motor, and a deceleration mechanism.
Figure 8:
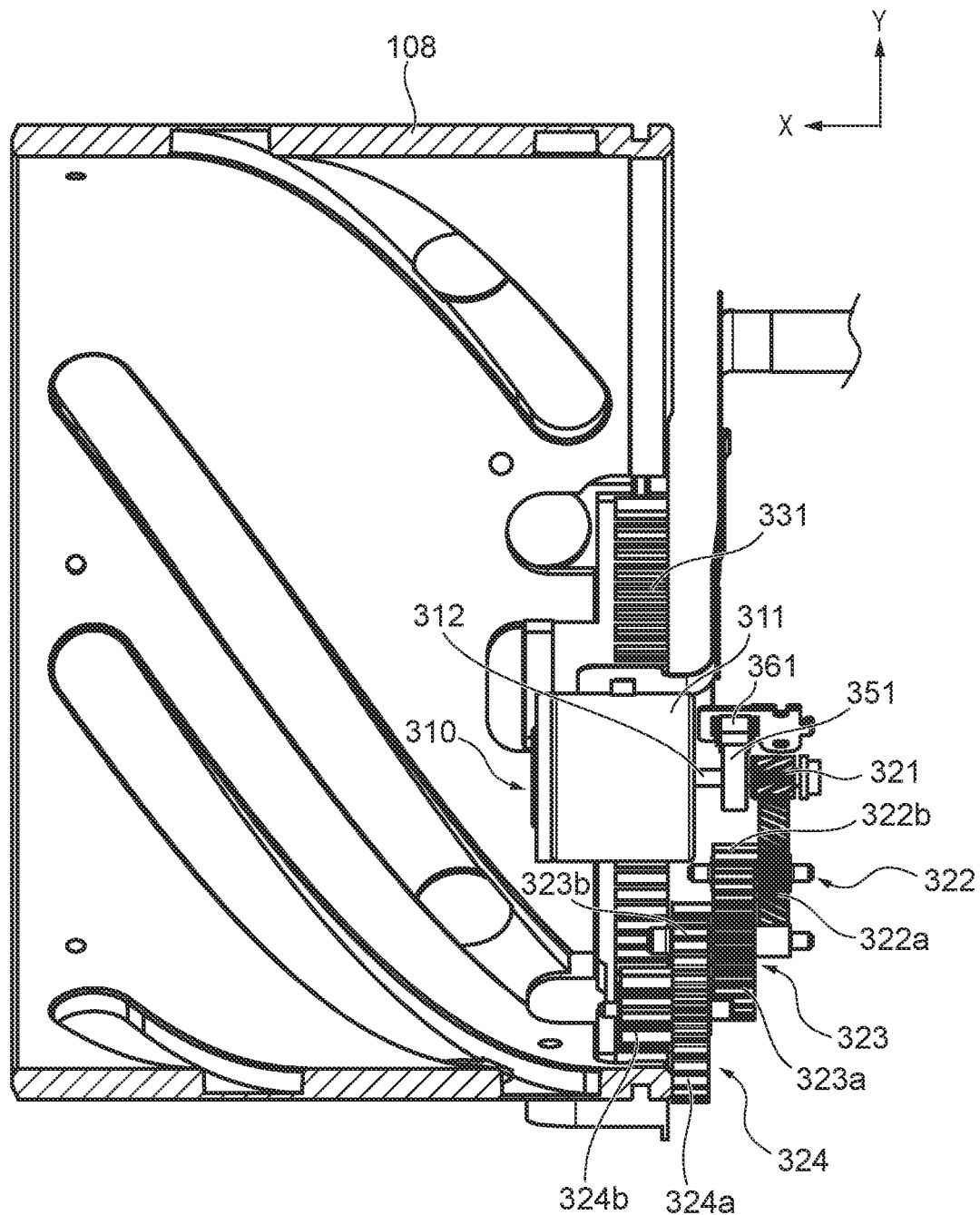
FIG. 8 is a cross-sectional view taken along line A-A of FIG. 7.

FIG. 7 is a rear view of the cam barrel 108, the drive motor 310, and the deceleration mechanism. FIG. 8 is a cross-sectional view taken along line A-A of FIG. 7.

The first reduction gear 321 is fixed to the rotation shaft 312 of the drive motor 310. Further, the second reduction gear 322, the third reduction gear 323, and the fourth reduction gear 324 are each rotatably held with respect to a rear side face of the fixed barrel 106. Specifically, front side rotation shafts of the reduction gears 322 to 324 are held in holding holes provided at the rear face of the fixed barrel 106, and rear side rotation shafts of the reduction gears 322 to 324 are held in holding holes provided in a gear cover 341 (FIG. 6). The gear cover 341 is fixed to the fixed barrel 106 so as to enclose the reduction gears 322 to 324 in the optical axis direction. The cam barrel gear 331 is fixed to an outer peripheral face of the cam barrel 108 so as to be connected to the reduction gear 324.

When the drive motor 310 rotates, the rotational driving force is decelerated via the reduction gears 321 to 324 and the cam barrel gear 331, and is transmitted to the cam barrel 108. In this way, the cam barrel 108 rotates about the optical axis C0 while the movement in the optical axis direction is restricted.

The focus group 201 is inserted and incorporated with respect to the inner periphery of the straight guide barrel 107 from the front side. Three movement rollers 231 (FIGS. 5A and 5B), which are coaxial rollers, are fixed to the focus group 201 with each disposed at an interval of 120 degrees. The straight guide barrel 107 has a straight guide groove that regulates the movement of the focus group 201 in the rotation direction and guides the straight movement of the straight guide barrel 107 in the optical axis direction. This straight guide groove is composed of three through grooves corresponding to phases of the three movement rollers 231 in a circumferential direction, and all of these through grooves have the same groove width. Further, the cam barrel 108 has a cam groove having a linear locus in the rotation direction corresponding to a stroke of the focus group 201. This cam groove is composed of three non-penetrating bottomed grooves corresponding to the phases of the movement rollers 231, and all of these bottomed grooves have the same cam locus, the same groove width, and the same groove depth. Each of the movement rollers 231 is engaged with the corresponding straight guide groove and the cam groove with a slight gap. When the cam barrel 108 rotates, the movement rollers 231 advance and retreat the focus group 201 in the optical axis direction along the cam locus of the cam groove by engaging the straight guide groove and the cam groove.

As shown in FIGS. 7 and 8, an engine unit 311 of the drive motor 310 is disposed at an inner periphery of the cam barrel 108, and is disposed at a position overlapping the cam barrel 108 when viewed from a direction orthogonal to the optical axis C0. Further, the drive motor 310 is disposed so that its rotation shaft 312 is substantially parallel to the optical axis direction and protrudes toward a direction of the rear face of the cam barrel 108.

A rotation detection magnet 351 is fixed to the rotation shaft 312. The rotation detection magnet 351 is magnetized in a direction of rotation of the motor and rotates together with the rotation shaft 312. A rotation detection sensor 361 is disposed in the vicinity of the rotation detection magnet 351. The rotation detection sensor 361 is fixed to, for example, the gear cover 341. The rotation detection sensor 361 reads the magnetism of the rotation detection magnet 351. As a result, an amount of rotation and the direction of rotation of the drive motor 310 are detected.

The first reduction gear 321 is fixed to the rotation shaft 312 at a position closer to a tip (−X side) than the rotation detection magnet 351. The first reduction gear 321 does not overlap the cam barrel 108 and the cam barrel gear 331 when viewed from the direction orthogonal to the optical axis C0.

The second to fourth reduction gears 322, 323, and 324 have large-diameter tooth portions 322a, 323a, 324a, and small-diameter tooth portions 322b, 323b, and 324b, respectively. The large-diameter tooth portion 322a of the second reduction gear 322 meshes with the first reduction gear 321. The large-diameter tooth portion 322a overlaps the cam barrel 108 when viewed from the optical axis direction when projected (FIG. 7). The large-diameter tooth portions 323a and 324a overlap the cam barrel 108 when viewed from the optical axis direction. As a result, it is possible to secure a large space inside the cam barrel 108 while increasing the diameter of the large-diameter tooth portions 322a to 324a of the second to fourth reduction gears 322 to 324. Further, in the focus group 201 that moves in the optical axis direction, the strength of the lens barrel 101 can be maintained because an amount of cutout of the cam barrel 108 for avoiding the reduction gear is small. In addition to this, a degree of freedom in designing a gear ratio can be secured, so that it is easy to reduce the number of gears for obtaining a desired gear ratio.

In this way, the drive motor 310 and the first to fourth reduction gears 321 to 324 are efficiently arranged utilizing a limited space inside the inner diameter of the cam barrel 108, so that it is possible to shorten the overall length of the product.

Figure 9A:
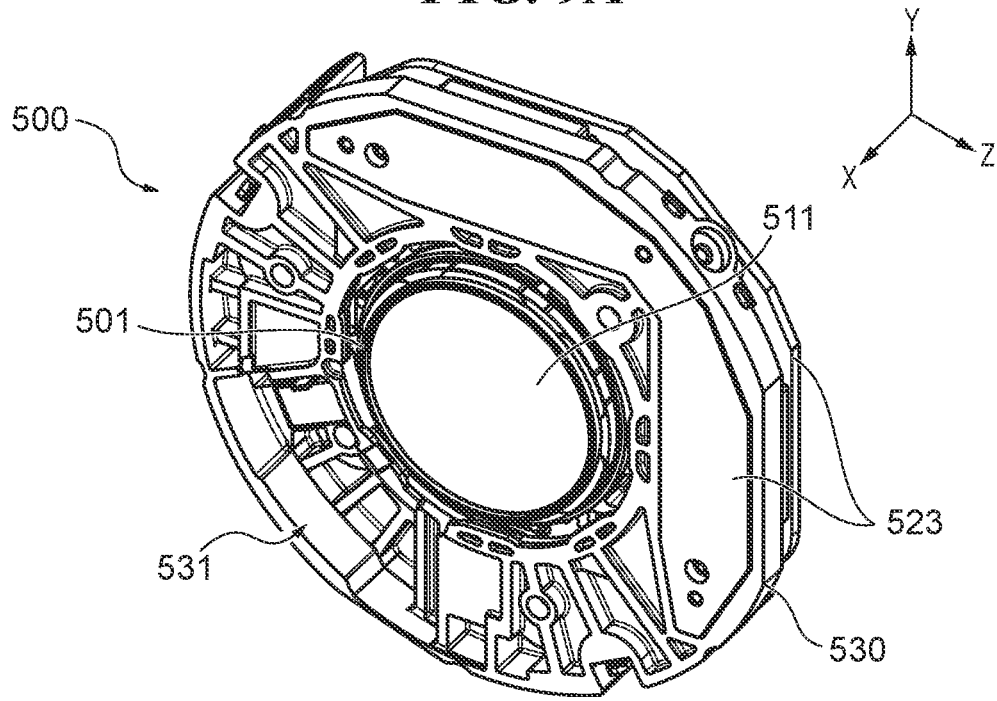
FIGS. 9A and 9B are front side and rear side perspective views of a stabilizing unit.
Figure 9B:
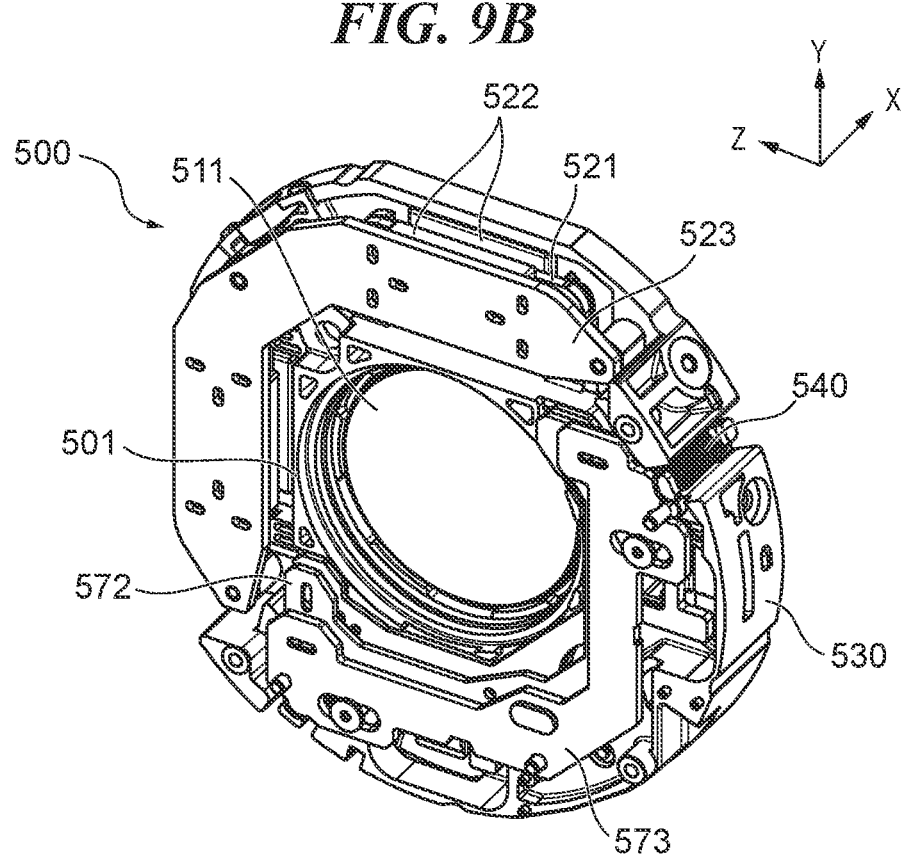
Figure 10:
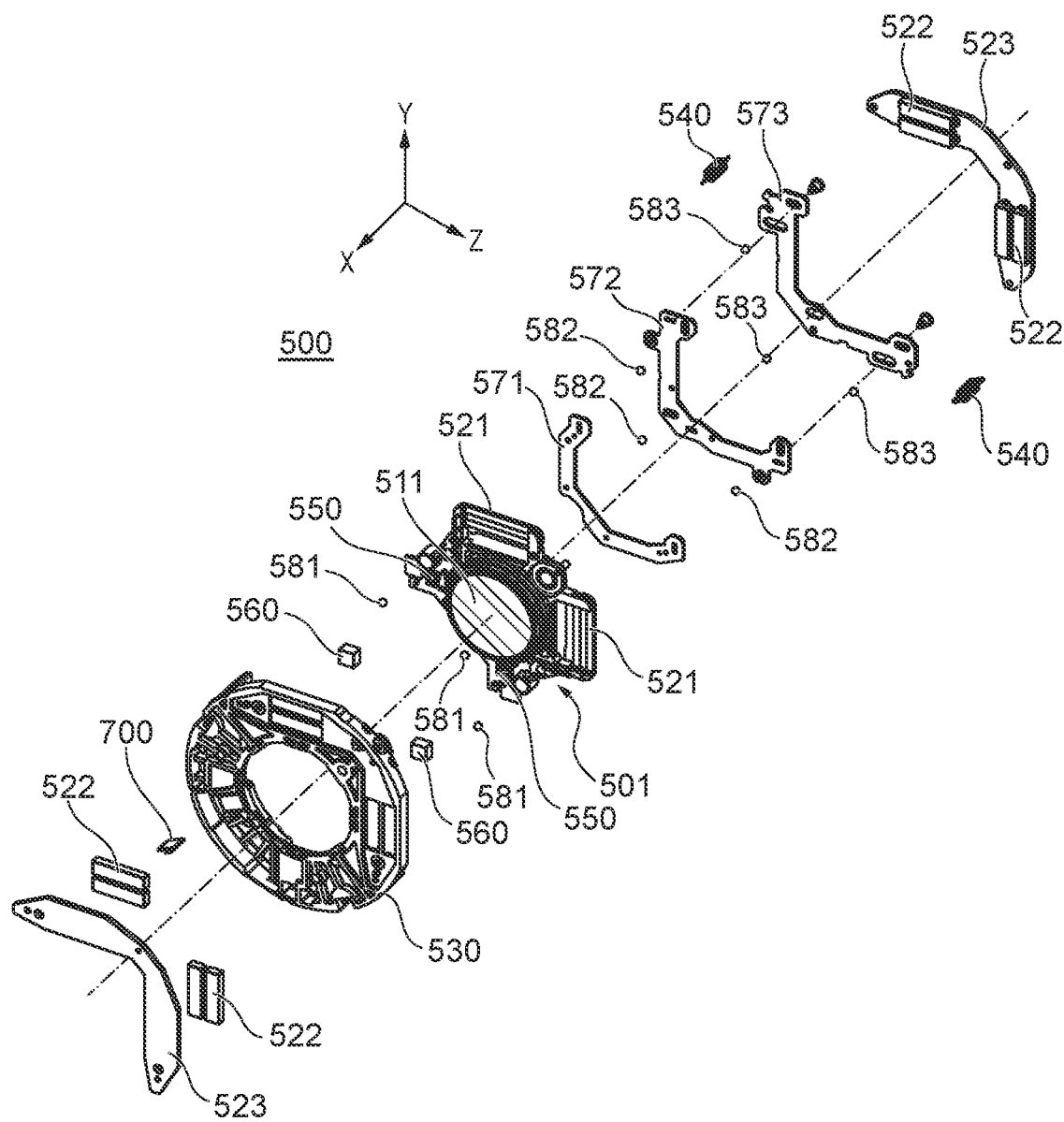
FIG. 10 is an exploded perspective view of the stabilizing unit.

Then, with reference to FIGS. 9A, 9B, and 10, a stabilizing unit (stabilizing member) 500 for correcting camera shake is disposed opposite to the cam barrel 108 (−X side in the optical axis direction) with respect to the fixed barrel 106 and adjacent to the fixed barrel 106. The drive motor 310 and the deceleration mechanism are disposed so as to avoid interference with the stabilizing unit 500.

FIGS. 9A and 9B are front side and rear side perspective views of the stabilizing unit 500, respectively. FIG. 10 is an exploded perspective view of the stabilizing unit 500.

The stabilizing unit 500 is configured with the fixing member 530 as a base member. The stabilizing group 501 holds a shift lens 511 and is supported by a fixing member 530 so as to be movable on the fixing member 530 in a direction substantially orthogonal to the optical axis direction by an urging member 540. Two drive coils 521 are held in the stabilizing group 501 with their phases shifted by 90 degrees in the circumferential direction. Two sets of a pair of drive magnets 522 are held to the fixing member 530 so as to enclose the drive coils 521 in the optical axis direction. Further, the fixing member 530 holds a yoke 523 corresponding to the two sets of a pair of drive magnets 522.

As described above, the drive coils 521 exists within a range of a magnetic field created by the drive magnets 522 and the yoke 523. A driving force is generated by passing a current through the drive coils 521, and the stabilizing group 501 holding the drive coils 521 can be driven in the direction substantially orthogonal to the optical axis C0 with respect to the fixing member 530.

As shown in FIG. 10, the stabilizing group 501 holds, in addition to the drive coils 521, two stabilization detection sensors 550 that detects the position of the stabilizing group 501 itself with the phase shifted by 90 degrees. The stabilization detection magnets 560 are held by the fixing member 530 with the phase similarly shifted by 90 degrees so as to face the stabilization detection sensors 550. As a result, the drive position of the stabilizing group 501 in a plane substantially orthogonal to the optical axis C0 can be detected, and control for shake correction is possible.

Next, a method for supporting the stabilizing group 501 will be described. In the optical axis direction, first rolling members 581 are disposed at three places between the stabilizing group 501 and the fixing member 530. The stabilizing group 501 can move via the first rolling members 581 in the plane orthogonal to the optical axis C0 with respect to the fixing member 530.

A first guide member 571 is fixed to the stabilizing group 501. The first guide member 571 has two V-groove shapes. Second guide member 572 has similar V-groove shapes formed at two locations facing the V-groove shapes of the first guide member 571. These V-groove shapes each have a longitudinal shape in the same direction, that is, the Z-axis direction, and are disposed so as to sandwich second rolling members 582. As a result, the stabilizing group 501 can move in the Z-axis direction with respect to the second guide member 572.

Further, a face of the second guide member 572 has three V-groove shapes on its −X side face. This V-groove shapes each have a longitudinal shape in the Y-axis direction. Third guide member 573 has similar V-groove shapes at three locations facing the −X side V-groove shapes of the second guide member 572. The third guide member 573 is held to the fixing member 530. Third rolling members 583 are sandwiched between the V-groove shapes of the third guide member 573 with and the V-groove shapes of the second guide member 572. As a result, the stabilizing group 501 and the second guide member 572 can move in the Y-axis direction with respect to the third guide member and the fixing member 530.

With the above configuration, the stabilizing group 501 can move in the Z-axis direction and the Y-axis direction with respect to the fixing member 530 while the movement in the rotation direction is restricted, so that it can move in the plane that is substantially orthogonal to the optical axis C0.

Figure 11A:
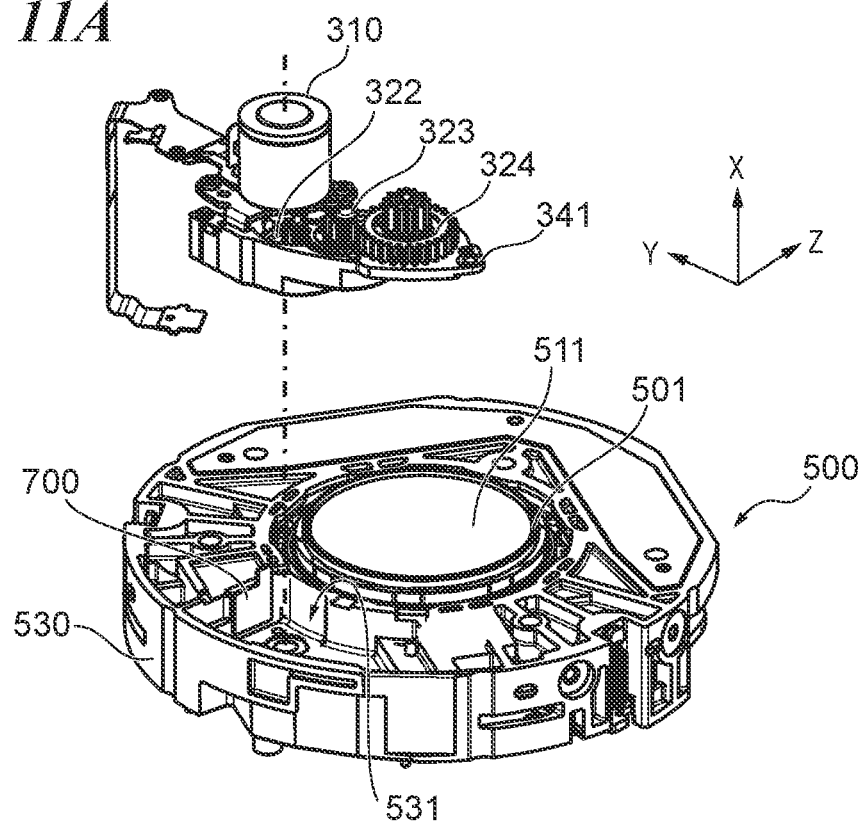
FIGS. 11A and 11B are a perspective view and a front view of the stabilizing unit and the drive motor.
Figure 11B:
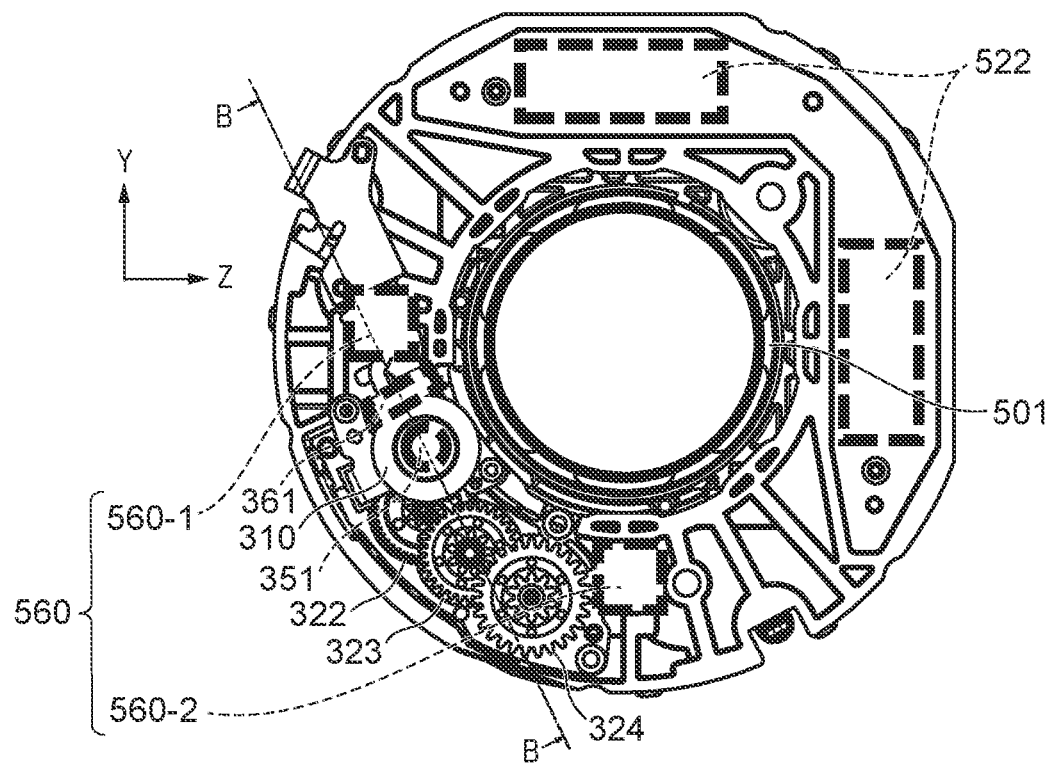
Figure 12:
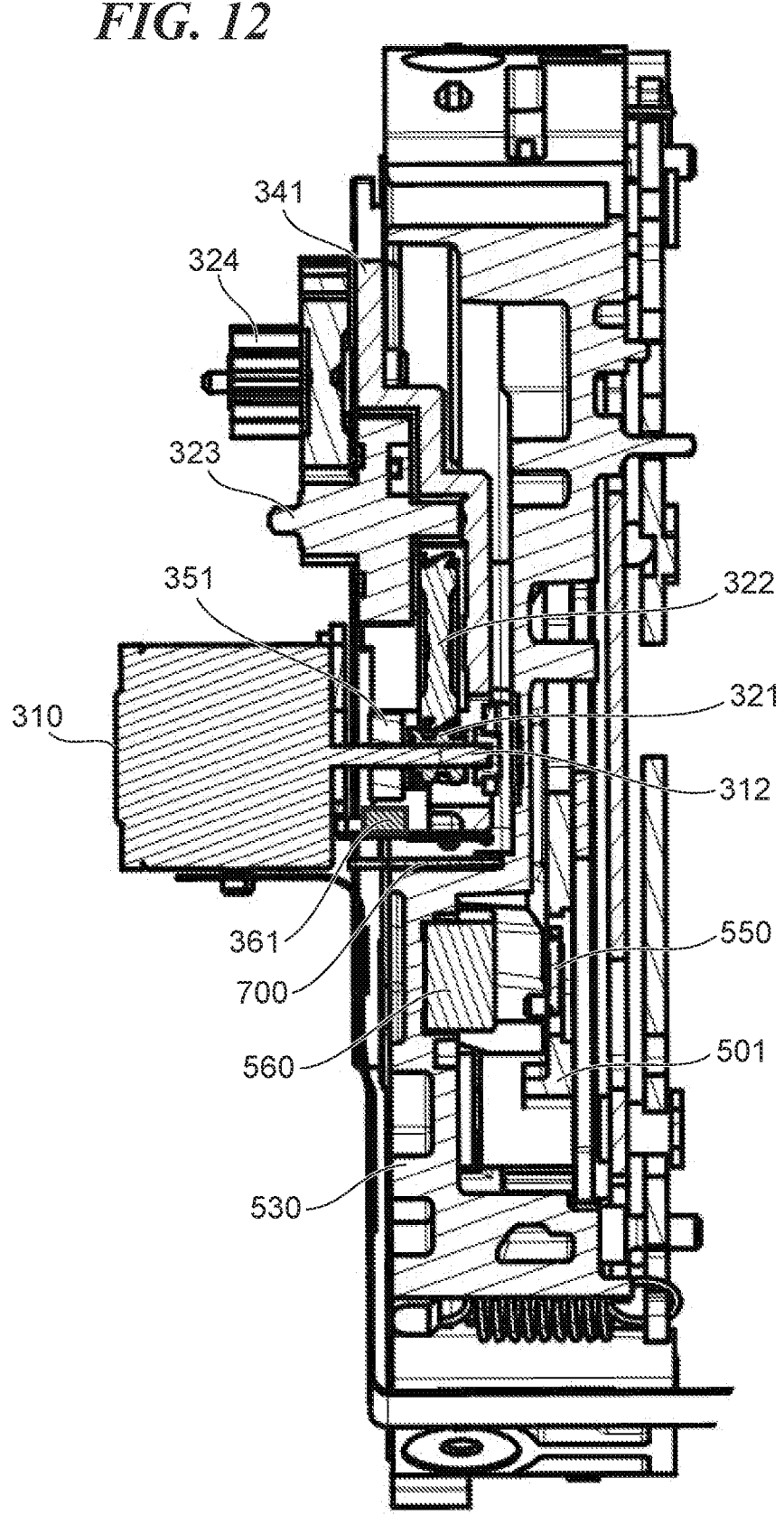
FIG. 12 is a cross-sectional view taken along line B-B of FIG. 11B.

FIG. 11A is a perspective view of the stabilizing unit 500 and the drive motor 310 before assembly. FIG. 11B is a front view of the stabilizing unit 500 and the drive motor 310 after assembly. FIG. 11B mainly shows an arrangement of the drive magnets 522, the stabilization detection magnets 560, the rotation detection magnet 351, and the rotation detection sensor 361. FIG. 12 is a cross-sectional view taken along line B-B of FIG. 11B.

As shown in FIG. 11B, the fixing member 530 has the two sets of a pair of drive magnets 522 with the phase shifted by 90 degrees. The fixing member 530 has two stabilization detection magnets 560 (560-1, 560-2) at a phase different from that of the two sets of a pair of drive magnets 522. That is, the stabilization detection magnets 560 are disposed at a phase opposite to the drive magnets 522 with the optical axis C0 disposed therebetween. The stabilization detection magnet 560-1 and the stabilization detection magnet 560-2 has a phase shifted by 90 degrees.

Generally, as a weight or a movement amount of the stabilizing group 501 increases, the drive magnets 522 increase in size, and the drive magnets 522 occupy a larger area than the stabilization detection magnet 560 when viewed from the plane orthogonal to the optical axis. The same applies to the present embodiment, and the area occupied by the stabilization detection magnet 560 is smaller than that of the drive magnets 522.

An accommodation portion 531 formed in the fixing member 530 is located at a phase between the stabilization detection magnet 560-1 and the stabilization detection magnet 560-2 (a region between them in the circumferential direction) (FIG. 11A). The accommodation portion 531 accommodates the rotation shaft 312 of the drive motor 310, the rotation detection magnet 351. the rotation detection sensor 361, the first to fourth reduction gears 321 to 324, the gear cover 341, and the like. As a result, each component is efficiently disposed, and the overall length of the product can be shortened. The drive motor 310 and the deceleration mechanism are disposed at the phase between the stabilization detection magnets 560-1 and 560-2.

Specifically, the drive motor 310 and at least part of the deceleration mechanism (here, the first and second reduction gears 321, 322) are disposed at a phase different from that of the drive magnets 522, and overlap the stabilizing group 501 when viewed from the direction orthogonal to the optical axis C0. This contributes to shortening the overall length of the product. In addition, at least the reduction gear 322 is disposed so as to overlap the cam barrel 108 when viewed from the optical axis direction (FIG. 7). This increases the degree of freedom in design.

At least part of each of components accommodated in the accommodation portion 531 overlaps the stabilizing group 501 when viewed from the direction orthogonal to the optical axis C0 (FIG. 12). For example, the rotation shaft 312 of the drive motor 310, the first reduction gear 321, and the rotation detection magnet 351 overlap the stabilizing group 501 when viewed from the direction orthogonal to the optical axis C0.

As shown in FIGS. 11A and 12, the accommodation portion 531 is further provided with a magnetic shield member 700. The magnetic shield member 700 is a flat plate-shaped magnetic material. The magnetic shield member 700 is attached to an inner face of the accommodation portion 531 by an adhesive (not shown).

As shown in FIG. 11B, the rotation detection magnet 351, the rotation detection sensor 361, and the stabilization detection magnet 560-1 are disposed substantially in a straight line when viewed from the optical axis direction. Further, when viewed from the optical axis direction, the rotation detection sensor 361 is disposed between the rotation detection magnet 351 and the stabilization detection magnet 560-1. The magnetic shield member 700 is disposed between the stabilization detection magnet 560-1 and the rotation detection sensor 361. Therefore, when viewed from the direction of the optical axis, the rotation detection magnet 351, the rotation detection sensor 361, the magnetic shield member 700, the stabilization detection magnet 560-1, and the stabilization detection sensor 550 facing the stabilization detection magnet 560-1 are disposed substantially in a straight line. As a result, although the magnetic shield member 700 has a simple flat plate shape, it effectively blocks a magnetic flux that the stabilization detection magnets 560 give to the rotation detection sensor 361 and a magnetic flux that the rotation detection magnet 351 gives to the stabilization detection magnets 560.

As described above, it is possible to efficiently arrange the components of the stabilizing unit 500 and the focus drive unit 301 while preventing mutual magnetic interference. Specifically, in a configuration in which the stabilizing unit 500 is disposed opposite to the cam barrel 108 with respect to the fixed barrel 106, the deceleration mechanism can be efficiently disposed.

According to the present embodiment, the drive motor 310 is located inside the cam barrel 108, and at least part of the deceleration mechanism (the second to fourth reduction gears 322 to 324 and the cam barrel gear 331) is disposed so as to overlap the cam barrel 108 when viewed from the optical axis direction (FIG. 7). As a result, the length of the lens barrel 101 can be shortened, and the gears that cannot be accommodated inside the cam barrel 108 can be disposed, so that the degree of freedom in design is increased. Therefore, the lens barrel 101 can be downsized and the degree of freedom in design can be increased. As a result, the desired gear ratio can be set with the minimum component configuration while realizing downsizing of the product as a whole.

For example, the large-diameter tooth portion 322a of the second reduction gear 322 overlaps the cam barrel 108 when viewed from the optical axis direction. As a result, it is easy to increase the diameter of the large-diameter tooth portion 322a, and a large space inside the cam barrel 108 can be secured.

Further, since the first reduction gear 321 does not overlap the cam barrel 108 when viewed from the direction orthogonal to the optical axis C0, the degree of freedom in designing the first reduction gear 321 is high. Further, since the first reduction gear 321 overlaps the stabilizing group 501 when viewed from the direction orthogonal to the optical axis C0, the length of the lens barrel 101 can be shortened.

According to the present embodiment, the drive motor 310 and at least part of the deceleration mechanism (the first and second reduction gears 321, 322) are disposed at a phase different from that of the drive magnets 522, and overlap the stabilizing group 501 when viewed from the direction orthogonal to the optical axis C0 (FIGS. 11B and 12). This contributes to shortening the overall length of the product. This also makes it possible to downsize the lens barrel 101 and increase the degree of freedom in design. Specifically, since at least part of the deceleration mechanism (first and second reduction gears 321, 322) is accommodated in the accommodation portion 531 formed in the fixing member 530, the efficient placement contributes to shortening the overall length of the product.

Further, the stabilization detection magnets 560 are disposed at a phase opposite to the drive magnets 522 with the optical axis C0 disposed therebetween. Further, the drive motor 310 and the deceleration mechanism are disposed at the phase between the stabilization detection magnets 560-1 and 560-2. Further, the rotation shaft 312 of the drive motor 310, the first reduction gear 321 and the rotation detection magnet 351 overlap the stabilizing group 501 when viewed from the direction orthogonal to the optical axis C0. As a result, the length of the lens barrel 101 can be shortened.

Further, the magnetic shield member 700 is disposed between the stabilization detection magnet 560-1 and the rotation detection sensor 361. Further, when viewed from the optical axis direction, the rotation detection magnet 351, the rotation detection sensor 361, the magnetic shield member 700, and the stabilization detection magnet 560-1 are disposed substantially in a straight line. As a result, it is possible to simplify the configuration of the magnetic shield member 700 for blocking the magnetic flux, and it is possible to save space.

It should be noted that, in the present embodiment, the stabilization detection magnets 560 are provided on the fixing member 530, and the stabilization detection sensors 550 are provided on the stabilizing group 501. However, on the contrary, the stabilization detection sensors 550 may be provided on the fixing member 530, and the stabilization detection magnets 560 may be provided on the stabilizing group 501.

It should be noted that although the present invention is applied to the lens barrel 101, which is an example of an optical device, the present invention can be applied to a lens-integrated image pickup apparatus integrally equipped with the lens barrel 101.

It should be noted that, in the present embodiment, the descriptions with "substantially" are not intended to exclude completeness. For example, "substantially parallel", "substantially orthogonal", and "substantially coincident" mean that they include perfectly parallel, orthogonal, and coincident.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-084026, filed May 12, 2020, which is hereby incorporated by reference herein in its entirety.

What is claimed is:

1. A lens barrel comprising:
a fixed barrel;
a guide barrel fixed to the fixed barrel;
a cam barrel rotatably supported by the guide barrel;
a driver that is supported by the fixed barrel and drives the cam barrel; and
a deceleration mechanism that is disposed so as to connect the driver and the cam barrel and decelerates rotation from the driver to transmit the rotation to the cam barrel,
wherein the driver is disposed inside the cam barrel,
a rotation shaft of the driver is parallel to a direction of an optical axis of an image pickup optical system,
a first reduction gear of the deceleration mechanism is fixed to the rotation shaft,
at least part of the deceleration mechanism is disposed so as to overlap the cam barrel when viewed from the direction of the optical axis, and
the first reduction gear does not overlap the cam barrel when viewed from a direction orthogonal to the optical axis.

2. The lens barrel according to claim 1, wherein a stabilizing member for correcting camera shake is disposed opposite to the cam barrel with respect to the fixed barrel.

3. The lens barrel according to claim 1, wherein
the deceleration mechanism includes a second reduction gear that meshes with the first reduction gear,
the second reduction gear has a large-diameter tooth portion and a small-diameter tooth portion, and
the large-diameter tooth portion of the second reduction gear overlaps the cam barrel when viewed from the direction of the optical axis.

4. The lens barrel according to claim 1, wherein
a stabilizing member for correcting camera shake is disposed opposite to the cam barrel with respect to the fixed barrel,
the stabilizing member includes a base member and a stabilizing group that is movably held by the base member in a direction orthogonal to the optical axis, and
the first reduction gear overlaps the stabilizing group when viewed from a direction orthogonal to the optical axis.

5. A lens barrel comprising:
a fixed barrel;
a guide barrel fixed to the fixed barrel;
a cam barrel rotatably supported by the guide barrel;
a driver that is supported by the fixed barrel and drives the cam barrel;

a deceleration mechanism that is disposed so as to connect the driver and the cam barrel and decelerates rotation from the driver to transmit the rotation to the cam barrel; and a stabilizing member that is disposed opposite to the cam barrel with respect to the fixed barrel, and corrects camera shake, wherein the stabilizing member includes a base member, a stabilizing group held by the base member so as to be movable in a direction orthogonal to a direction of an optical axis of an image pickup optical system, and at least two drive magnets for moving the stabilizing group, a rotation shaft of the driver is parallel to the direction of the optical axis, a first reduction gear of the deceleration mechanism and a rotation detection magnet that detects rotation of the rotation shaft are fixed to the rotation shaft, the driver and at least part of the deceleration mechanism are disposed at a phase different from a phase of the drive magnets, and overlaps the stabilizing group when viewed from a direction orthogonal to the optical axis, and the rotation shaft, the first reduction gear, and the rotation detection magnet overlap the stabilizing group when viewed from a direction orthogonal to the optical axis.

6. The lens barrel according to claim 5, wherein
the stabilizing member includes two stabilization detection magnets that detect a position of the stabilizing group, and
the two stabilization detection magnets are disposed at a phase opposite to the drive magnet with the optical axis interposed therebetween.

7. The lens barrel according to claim 6, wherein
the driver and the deceleration mechanism are disposed at a phase between the two stabilization detection magnets.

8. The lens barrel according to claim 6, wherein
a rotation shaft of the driver is parallel to the direction of the optical axis,
a first reduction gear of the deceleration mechanism and a rotation detection magnet that detects rotation of the rotation shaft are fixed to the rotation shaft,
the lens barrel further includes a rotation detection sensor that detects magnetism of the rotation detection magnet,
the rotation detection magnet, the rotation detection sensor, and one of the stabilization detection magnets are disposed in a straight line when viewed from the direction of the optical axis, and
a magnetic shield member is disposed between the rotation detection sensor and the one of the stabilization detection magnets.

9. The lens barrel according to claim 5, wherein
the base member has an accommodation portion, and
the at least part of the deceleration mechanism is accommodated in the accommodation portion.

10. The lens barrel according to claim 5, wherein
the driver is disposed inside the cam barrel, and
at least part of the at least part of the deceleration mechanism is disposed so as to overlap the cam barrel when viewed from the direction of the optical axis.

11. An image pickup apparatus comprising:
a lens barrel,
wherein the lens barrel includes a fixed barrel, a guide barrel fixed to the fixed barrel, a cam barrel rotatably supported by the guide barrel, a driver that is supported by the fixed barrel and drives the cam barrel, and a deceleration mechanism that is disposed so as to connect the driver and the cam barrel and decelerates rotation from the driver to transmit the rotation to the cam barrel,
the driver is disposed inside the cam barrel,
a rotation shaft of the driver is parallel to a direction of an optical axis of an image pickup optical system,
a first reduction gear of the deceleration mechanism is fixed to the rotation shaft,
at least part of the deceleration mechanism is disposed so as to overlap the cam barrel when viewed from the direction of the optical axis, and
the first reduction gear does not overlap the cam barrel when viewed from a direction orthogonal to the optical axis.

12. An image pickup apparatus comprising:
a lens barrel,
wherein the lens barrel includes a fixed barrel, a guide barrel fixed to the fixed barrel, a cam barrel rotatably supported by the guide barrel, a driver that is supported by the fixed barrel and drives the cam barrel, a deceleration mechanism that is disposed so as to connect the driver and the cam barrel and decelerates rotation from the driver to transmit the rotation to the cam barrel, and
a stabilizing member that is disposed opposite to the cam barrel with respect to the fixed barrel and corrects camera shake,
the stabilizing member includes a base member, a stabilizing group held by the base member so as to be movable in a direction orthogonal to a direction of an optical axis of an image pickup optical system, and at least two drive magnets for moving the stabilizing group,
a rotation shaft of the driver is parallel to the direction of the optical axis,
a first reduction gear of the deceleration mechanism and a rotation detection magnet that detects rotation of the rotation shaft are fixed to the rotation shaft,
the driver and at least part of the deceleration mechanism are disposed at a phase different from a phase of the drive magnets, and overlaps the stabilizing group when viewed from a direction orthogonal to the optical axis, and
the rotation shaft, the first reduction gear, and the rotation detection magnet overlap the stabilizing group when viewed from a direction orthogonal to the optical axis.

* * * * *